United States Patent [19]
Lindemann

[11] 3,852,233
[45] Dec. 3, 1974

[54] THERMOSETTING VINYL ESTER-ETHYLENE EMULSION COPOLYMERS

[75] Inventor: Martin K. Lindemann, Greenville, S.C.

[73] Assignee: Chase. S. Tanner Co., Greenville, S.C.

[22] Filed: Mar. 12, 1973

[21] Appl. No.: 340,536

Related U.S. Application Data

[63] Continuation-in-part of Ser. No. 142,406, May 11, 1971, abandoned.

[52] U.S. Cl.. 260/29.6 TA, 260/17 R, 260/29.4 UA
[51] Int. Cl. ............................................. C08f 45/24
[58] Field of Search............ 260/29.44 A, 29.6 RB, 260/29.6 MN, 29.6 NR, 29.6 T, 29.6 TA, 85.7, 851, 17 R

[56] References Cited
UNITED STATES PATENTS

| | | | |
|---|---|---|---|
| 3,345,318 | 10/1967 | Lindermann et al. | 260/29.6 TA |
| 3,380,851 | 4/1968 | Lindermann et al. | 260/29.6 TA |
| 3,391,181 | 7/1968 | Scheuerl | 260/482 |

FOREIGN PATENTS OR APPLICATIONS

| | | | |
|---|---|---|---|
| 610,432 | 12/1960 | Canada | 260/29.4 UA |

Primary Examiner—Lorenzo B. Hayes
Attorney, Agent, or Firm—Arnold G. Gulko

[57] ABSTRACT

Vinyl ester-ethylene emulsion copolymers are modified to introduce improved thermosetting cure capacity by including in the copolymer a proportion of a formaldehyde addition product with an allyl carbamate.

14 Claims, No Drawings

THERMOSETTING VINYL ESTER-ETHYLENE EMULSION COPOLYMERS

The present application is a continuation-in-part of my prior application Ser. No. 142,406, filed May 11, 1971, now abandoned.

The present invention relates to emulsion copolymers of vinyl esters, such as vinyl acetate, with ethylene which have been modified to introduce improved thermosetting cure capacity. These emulsion copolymers are known to be useful as binders for nonwoven fabrics, as impregnants for woven fabrics, as a binder in printing pastes, as laminating adhesives, and for other similar purposes. These emulsion polymers are illustrated, for example, by U.S. Pat. Nos. 3,345,318, 3,380,851, 3,301,809 and 3,081,197, where N-methylol acrylamide is used to modify vinyl acetate copolymers in order to provide the desired curing characteristics. This invention has, as its main objective, the achievement of improved cure characteristics, which can be demonstrated by the achievement of increased insolubilization after cure.

In connection with the thermosetting characteristics which it is desired to achieve in accordance with the invention, the increased insolubilization which is achieved leads to many important benefits. With particular reference to fabrics which have been treated with the emulsions of the invention and then baked in order to cure the deposited copolymer, wash resistance and crocking are improved when the emulsion is used as a binder in a printing paste, nonwoven web integrity is improved when the emulsion is used as a binder for a nonwoven web, durability to washing is improved when the emulsion is used to modify the hand of a woven fabric, wash and solvent resistance are improved when the emulsion is used in a foam applied to a fabric to serve as a drapery backing, and peel strength is improved when the emulsion is used for laminating purpose.

As will be appreciated, the invention, like the prior art, is concerned with aqueous emulsions in which the aqueous medium has colloidally suspended therein an emulsion copolymer of vinyl ester, such as vinyl acetate, with ethylene which has been modified to provide the properties noted above.

In accordance with the invention, the vinyl acetate-ethylene emulsion copolymer is modified by the copolymerization therein of a formaldehyde adduct with an allyl carbamate. These allyl carbamates have the formula:

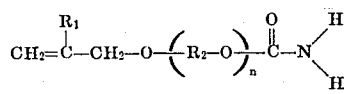

in which $R_1$ is hydrogen or methyl, $R_2$ is an alkylidene group containing from 2-4 carbon atoms, and $n$ is an integer from 0-10, preferably from 0-2.

Various allyl carbamates are useful herein, especially allyl carbamate and methallyl carbamate.

Allyl carbamate has the formula:

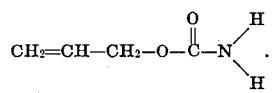

This monoethylenic monomer is not an amide and it will react with formaldehyde in an addition reaction with the two amino hydrogen atoms to generate the N-methylol group. When 1 molar proportion of formaldehyde is taken up, the derivative can be described by the formula:

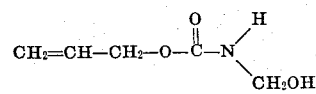

The same reaction can proceed to take up more formaldehyde to increase the functionality which is generated.

Regardless of whether one or two moles of formaldehyde are reacted into the molecule, the monomer is an allyl ester and this is most important in the copolymerization with vinyl acetate, or other vinyl ester such as vinyl butyrate with ethylene, since the monomer reactivity ratio of the allylic unsaturation of the allyl ester with vinyl acetate is close to 1:1. In contrast, methylol acrylamide enters the vinyl ester-ethylene copolymer much more rapidly than the vinyl ester or the ethylene and is consumed long before the vinyl acetate and ethylene are polymerized, forcing a considerable portion of the polymer to lack the reactive group which is the basis for subsequent insolubilization. Also, the emulsion copolymerization is greatly improved creating a synergistic improvement in the capacity of the copolymer to become insolubilized on curing. This may be due to the fact that the allyl carbamates used herein are more soluble in the ethylene-containing emulsion particles and, therefore, less subject to being diverted into the aqueous phase of the emulsion. This solubility factor may partially account for the enormous improvement in insolubilization which is obtained in this invention and which is not obtained in the absence of ethylene in the copolymer as will be documented hereinafter.

As previously indicated, the allyl carbamate may include ether groups between the allyl group and the carbamate group. These ethers can be provided by reacting the allyl alcohol with an alkylene oxide, such as ethylene oxide, before converting the resulting alcohol to the carbamate as will be illustrated hereinafter.

The adduction of the carbamate with formaldehyde is well known and conventional and yields N-methylol derivatives. These are a mixture of the mono-N-methylol adduct, the di-N-methylol adduct and unreacted carbamate which, if present, is not harmful.

The N-methylol groups may be left unreacted, or they may be etherified with a $C_1$–$C_8$ alcohol, preferably a $C_1$–$C_4$ alcohol. The alcohol is released on baking to regenerate the N-methylol group for cure, as is well known. Accordingly, ethers of the allyl carbamates are included herein. Preferred alcohols are methyl alcohol and ethyl alcohol. Isopropyl alcohol and isobutyl alcohol are also highly effective. 2-ethoxy ethanol and 2-butoxy ethanol are also useful.

While vinyl acetate is the preferred vinyl ester, all of the vinyl esters with saturated aliphatic monocarboxylic acids are useful in this invention, vinyl stearate or vinyl versatate further illustrating the class under consideration.

While the vinyl ester and ethylene are intended to constitute the bulk of the emulsion copolymer, with the allyl carbamate-formaldehyde adduct providing the essential thermosetting cure, other monoethylenic monomers copolymerizable with the vinyl ester may be present in small amount, especially those which are reactive with the N-methylol group.

Particularly desirable monomers for inclusion in small amount in the copolymer are acrylamide, methacrylamide, or other monoethylenic unsaturated amide as well as monoethylenic alcohols such as allyl alcohol, 2-hydroxy ethyl acrylate- or methacrylate, or the like.

The presence of a small proportion of an amide or alcohol as noted above is particularly desirable since it significantly improves the cure with the N-methylol functionality of the allyl carbamate-formaldehyde adduct.

Another monomer which may optionally be present in small amount and which is helpful to enhance the cure is a small proportion of monoethylenic acid such as maleic, acrylic, or methacrylic acids or, more preferably, crotonic acid, 0.5–3 percent being typical. Monoethylenic sulphonic acids, or their salts, such as 2-sulphoethyl methacrylate or sodium vinyl sulphonate are also useful.

The vinyl acetate-ethylene copolymers of this invention are characterized by an ethylene content of from 5–40 percent, preferably from 20–40 percent.

The monomers providing thermosetting characteristics may be used in an amount of from 0.5–15 percent, but are preferably used in an amount of from 2 to 10 percent. As previously indicated, the formaldehyde addition product with allyl carbamate will constitute the bulk of the monomers providing thermosetting characteristics, but a monoethylenic amide or alcohol, either alone or together with a monoethylenic carboxylic acid is preferably included in minor proportion with respect to the total monomers providing thermosetting cure. Other monomers which may be present are illustrated by acrylonitrile or vinyl chloride. At least 40 percent of the copolymer, preferably at least 55 percent, of the copolymer will consist of vinyl ester, preferably vinyl acetate.

It is also possible to include up to about 1 percent of a polyethylenic monomer as a chain extender, such as diallyl maleate or triallyl cyanurate or butylene glycol diacrylate, though this is not normally required herein because of the excellent copolymerization and distribution within the copolymer which is obtained using the allyl carbamates disclosed herein.

Since the aqueous emulsion polymerization of vinyl acetate with ethylene is well known per se, it will not be described at length. However, it is stressed again that the N-methylol allyl carbamate is easier to use since it will enter the copolymer at about the same rate as the vinyl acetate and ethylene so that the distribution of the N-methylol group in the final copolymer is considerably improved, and the greater monomer solubility provides a surprising boost in the capacity of the copolymer to become insolubilized on baking. From 0.5–7 percent of the N-methylol allyl carbamate or its ether is preferred to provide the desired insolubilization. Auxiliary agents may also be present, as is known, such as protective colloids illustrated by polyvinyl alcohol and hydroxyethyl cellulose.

From the standpoint of cure, baking is normally carried out at temperatures of from 250°–500°F. for periods of from 30 seconds to 1 hour, but more usually at 275°–350°F. for from 2–20 minutes.

The proportions referred to herein and throughout this specification are by weight unless otherwise specified.

The invention is illustrated in the examples which follow.

EXAMPLE 1

A monomer emulsion was made up by mixing the following ingredients in the order stated:

| Monomer Emulsion (Only 90% of the Emulsion is Charged) | Parts |
|---|---|
| Vinyl acetate | 1650 grams |
| N-methylol allyl carbamate (16.9% in water) | 245 grams |
| Acrylamide (21% in water) | 261.5 grams |
| Nonyl phenol polyethylene glycol ether containing 9 moles ethylene oxide (Tergitol TP-9 may be used) | 33 grams |
| Nonyl phenol with 40 moles of ethylene oxide per mole of phenol in a 70% aqueous solution (Tergitol 3477 may be used) | 47.3 grams |

A reaction flask equipped with stirrer, reflux condenser and thermometer was charged with:

| Charge | Parts |
|---|---|
| Water | 1030 grams |
| Nonyl phenol polyethylene glycol ether containing 9 moles ethylene oxide | 16.6 grams |
| Nonyl phenol with 40 moles of ethylene oxide per mole of phenol in a 70% aqueous solution | 24 grams |
| Sodium persulfate | 11 grams |
| Fe So$_4$ | 2 grains |
| Above Monomer Emulsion | 220 grams |

The pH was adjusted to 4 with acetic acid. After heating the reaction mixture to 38°C., 5 cc of a 6 percent water solution of sodium formaldehyde sulfoxylate were added which raised the kettle temperature to 46°C. The remaining monomer emulsion (to 90 percent of the total amount prepared) was added incrementally over a period of 4 hours during which time ammonia was added periodically to maintain the pH in the range of 2.5–3.5 and the 6 percent sulfoxylate solution was also added periodically (a total of 32 cc) to maintain the reaction temperature at 52–54°C. At this point, the free monomer content was 0.33 percent. The resulting latex was neutralized with ammonia to pH 4.5 and cooled. 500 grams of water were then added to provide a solids content of 45.3 percent. The product had the following additional properties:

| | |
|---|---|
| Viscosity (No. 1 Spindle, 60 rpm, Brookfield) | 68 centipoises |
| Intrinsic viscosity in deciliters/gram (see note 1 for measurement details) | 1.71 |
| Insolubles after curing 45 minutes at 110°C. (see note 2 for extraction details) | 89.5% Insolubles in Chloroform |
| Average particle size | 0.5 micron |

Note 1 — In measuring viscosity, a sample of the polymer emulsion (0.5 cc) is added to 100 cc. of reagent grade dimethyl formamide and the mixture agitated for 20 minutes and filtered. The flow time of the solution so-prepared is then compared with the flow time of the pure solvent using a Ubbelohde Viscosimeter (Cannon-Fenske) at 30°C. The relative viscosity is the fraction obtained by dividing the flow time of the solution by the flow time of the pure solvent. The Huggin's equation is then used to calculate the intrinsic viscosity from the relative viscosity measurement and from the resin solids content in grams per 100 ml. of emulsion.

Note 2 — A specimen is baked at the given temperature for the time listed and then extracted with the named solvent. The per cent insoluble value is obtained by pouring 25 ml. of the polymer emulsion on a glass plate, and allowing it to dry overnight at room temperature. Water is then removed by 24 hours storage in a desiccator. The dry film is then scraped off the glass plate and 4 grams thereof are placed in a soxhlet thimble. Extraction is then carried out with 350 ml. of the named solvent at boiling for 48 hours. The solvent is then evaporated and the residue is dried overnight at 95°C. in a forced air oven. The weight of the polymer sample after extraction is compared with the weight of the sample before extraction to provide the per cent insoluble value.

EXAMPLE 2

A monomer emulsion was made up by mixing the following ingredients in the order stated:

| Monomer Emulsion (Only 90% of the Emulsion is Charged) | Parts |
|---|---|
| Vinyl acetate | 528 grams |
| Butyl acrylate | 352 grams |
| N-methylol allyl carbamate (16.9% in water) | 136 grams |
| Acrylamide (16.9% in water) | 136 grams |
| Maleic anhydride | 5.5 grams |
| Nonionic emulsifying agent (an ethylene oxide adduct with octyl phenol containing 40 moles of ethylene oxide per mole of octyl phenol in a 70% water solution) | 30.8 grams |

A reaction flask equipped with stirrer, reflux condenser and thermometer was charged with:

| Charge | Parts |
|---|---|
| Water | 740 grams |
| Nonionic emulsifying agent (an ethylene oxide adduct with octyl phenol containing 40 moles of ethylene oxide per mole of octyl phenol in a 70% water solution) | 28 grams |
| Sodium persulfate | 4 grams |
| FeSo$_4$ | 2 grains |
| Monomer Emulsion of this example 2 | 103 grams |

The pH was adjusted to 3.5 with dilute ammonia. After heating the reaction mixture to 36°C., 2.5 cc of a 6 percent water solution of sodium formaldehyde sulfoxylate were added which raised the kettle temperature to 41°C. The remaining monomer emulsion (to 90 percent of the total amount prepared) was then added incrementally over a period of 3.5 hours during which time a total of 10.5 cc of sodium persulfate (10 percent water solution) were added periodically to maintain the pH in the range of 3.5 – 4.0, and the 6 percent sulfoxylate solution was also added periodically (total of 28 cc) to maintain the reaction temperature at 52°–54°C. After four hours, 10 drops of t-butyl hydroperoxide were added which brought the conversion of monomer to polymer to approximately 100 percent. The resulting latex was neutralized with ammonia to pH 5.6 and cooled. 30 cc of water were added to provide a solids content of 45 percent.

The product exhibited the following additional characteristics:

| | |
|---|---|
| Viscosity (No. 1 Spindle, 60 rpm, Brookfield) | 48 centipoises |
| Intrinsic viscosity (see note 1) | 1.27 |
| Insolubles after curing 45 minutes at 110°C. (see note 2) | 89.7% Insolubles in 1,1,1-trichloroethylene |
| Average particle size | 0.18 micron |

EXAMPLE 3

| Monomer Emulsion (100% charged) | Parts |
|---|---|
| Vinyl acetate | 10,000 grams |
| N-methylol allyl carbamate (16.9% in water) | 2120 grams |
| Acrylamide (16.9% in water) | 2120 grams |
| Nonyl phenol polyethylene glycol ether containing 9 moles ethylene oxide | 200 grams |
| Nonyl phenol with 40 moles of ethylene oxide per mole of phenol in a 70% aqueous solution | 284 grams |

A stainless steel pressure reactor equipped with agitator, temperature controls, feed pump and gas inlet tube was charged with:

| Charge | Parts |
|---|---|
| Water | 8550 grams |
| Nonyl phenol polyethylene glycol ether containing 9 moles ethylene oxide | 111 grams |
| Nonyl phenol with 40 moles of ethylene oxide per mole of phenol in a 70% aqueous solution | 158 grams |
| Previously produced vinyl acetate-ethylene copolymer of fine particle size to provide seeds for particle size control during the emulsion polymerization (see note 3) | 123 grams |
| Sodium persulfate | 48.5 grams |
| FeSo$_4$ | 0.1 gram |
| Monomer emulsion of this example | 1525 grams |

The reactor was purged with nitrogen, then with ethylene, after which the reactor was pressurized to 68 atmosphere with ethylene. After heating the reaction mixture to 26°C., 4.4 cc of 6 percent water solution of sodium formaldehyde sulfoxylate were added after which the reaction temperature rose to 47°C. The remaining monomer emulsion (to 100 percent of the total amount prepared) was added over a 4 hour period incrementally to keep the reaction temperature at 54°–56°C. A total of 545 cc of 6 percent water solution of sodium formaldehyde sulfoxylate and 600 cc of sodium persulfate were added incrementally to maintain the reaction. The ethylene pressure was maintained at 65 atmospheres during most of the run, and then the ethylene pressure was slowly reduced until the free monomer content was below 1 percent. After venting the excess ethylene and cooling, the pH was adjusted to 5.3 with ammonia. The product had the following properties:

| | |
|---|---|
| Viscosity (No. 2 Spindle, 60 rpm, Brookfield) | 141 centipoises |
| Solids | 48.5% |
| Intrinsic viscosity (see note 1) | 1.24 |
| Insolubles, after curing 45 minutes at 110°C. | 86.5% Insolubles in 1,1,1-trichloroethylene |
| after curing 10 minutes at 150°C. | 85.6% Insolubles in 1,1,1-trichloroethylene |
| pH | 2.9 |
| Average particle size | 0.25 micron |
| Ethylene in copolymer | 25% by weight |

Note 3 — The specific nature of the emulsion polymer is of no consequence. In repeating the example, the seeds are provided using a portion of polymer emulsion produced in the previous run.

EXAMPLE 4

The N-methylol allyl carbamate used in the previous examples may be prepared as follows.

44 grams of allyl carbamate (0.5 mol) was added to 300 grams of water. The pH was adjusted to 11.5 with approximately 3 cc of a 50 percent sodium hydroxide solution after which 16.5 grams of paraformaldehyde were added. The mixture was heated to 75°C. and kept for three hours. An additional 6 cc of a 50 percent sodium hydroxide solution was added incrementally to maintain the pH at 11. The formaldehyde content was determined to be 0.4 percent after 3 hours reaction. The pH was then adjusted to 5 with sulfuric acid to provide the N-methylol derivative.

EXAMPLE 5

Examples 1, 2 and 3 were repeated, and then repeated again while replacing the aqueous solution of N-methylol allyl carbamate with a corresponding aqueous solution of N-methylol acrylamide in the same concentration. The replacement was on a molar basis so that the same number of N-methylol functional groups is introduced into the copolymer, and the various runs were made side-by-side to insure comparability. The various copolymers so-produced were tested to determine how completely they were insolubilized using the procedure set forth in Note 2, hereinbefore, and employing a bake schedule of 10 minutes at 150°C. with 1,1,1-trichloroethylene as the extracting solvent.

The repeat of Example 1 in which vinyl acetate is the only non-reactive monomer shows that replacement of the N-methylol allyl carbamate with N-methylol acrylamide reduces the insolubility of the copolymer from 96.7 percent to 88.3 percent. The N-methylol allyl carbamate copolymer is superior, but the N-methylol acrylamide copolymer is reasonably satisfactory.

The repeat of Example 2 in which vinyl acetate and butyl acrylate are the non-reactive monomers shows that replacement of the N-methylol allyl carbamate with N-methylol acrylamide reduces the insolubility of the copolymer from 96.8 percent to 80.8 percent. Again, the N-methylol allyl carbamate copolymer is superior, but the N-methylol acrylamide copolymer is reasonably satisfactory.

The repeat of Example 3 (vinyl acetate and ethylene are the non-reactive monomers) shows that the replacement of the N-methylol allyl carbamate with N-methylol acrylamide reduces the insolubility of the copolymer from 91.1 percent to 46.2 percent, establishing that the insolubility produced using N-methylol allyl carbamate is outstandingly different, converting a species which exhibits extensive solubility into one which is reasonably inert.

The extensive increase in insolubilization provided in the vinyl acetate-ethylene species demonstrates a remarkable change in properties which produces superior abrasion resistance and remarkably enhanced resistance to the solvents employed in dry cleaning. It also provides improved tensile strength when the emulsions are used as a binder in non-woven fabrics.

EXAMPLE 6

Preparation of Allylethoxy Carbamate

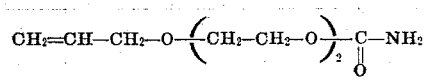

146 grams (1 mole) of an addition product of allyl alcohol and 2 moles of ethylene oxide are heated to 90°C. in a three necked flask equipped with stirrer and thermometer. To this 66 grams (1.1 moles) of urea are added, and after the urea is dissolved, 2 grams of anhydrous zinc acetate are added as catalyst. The heat is then maintained at 90°-100°C. The extent of reaction is measured by the amount of ammonia coming off. After the theoretical amount of ammonia has been taken off, 1,400 grams of water are added to an approximately 20 percent solution of carbamate.

The number of ethylene oxide units in the allylethoxy carbamate can be varied from 1 to 10 ethylene oxide units.

EXAMPLE 7

Preparation of N-Methylol Allylethoxy Carbamate 160 grams (0.1 mole) of a 20% aqueous solution of allylethoxy carbamate

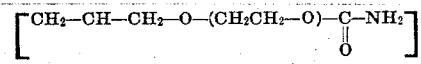

are heated to 60°C. after which 3 grams (0.1 mole) of paraformaldehyde together with 1 gram of sodium carbonate are added. After about 2 hours, all formaldehyde has been reacted and the pH is adjusted to 5.5 with hydrochloric acid.

EXAMPLE 8

Preparation of Ethoxy N-Methylol Allyl Carbamate
This compound has the formula:

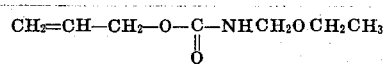

784 grams (7.85 moles) of allyl carbamate and 216 grams (7.2 moles) of paraformaldehyde are charged to a three necked flask. The pH is adjusted to pH = 10–10.2 with 50 percent NaOH and heated to 40°C. After the free formaldehyde has decreased to less than 1 percent (3 hours reaction time), 442 grams of methanol and 20 cc. benzene are added and the pH decreased to 3.0 with 10 cc. formic acid. The mixture is then heated to 50°C. for 3 hours during which time 170 grams of a benzene-water-methanol azeotrope are distilled off. The pH is then readjusted to 5.5 with 50% NaOH and all excess methanol is distilled off.

The methyl ether of the N-methylol allyl ethoxy carbamate can be prepared similarly. Other alkyl ethers such as ethyl or isobutyl can also be prepared using this method.

The monomers in Examples 6, 7 and 8 can be used to replace the N-methylol allyl carbamate used in Examples 1–4 to obtain the same results.

The invention is defined in the claims which follow.

I claim:

1. An aqueous emulsion comprising an aqueous medium having colloidally suspended therein an emulsion copolymer consisting essentially of from 5–40 percent of ethylene, from 0.5–15 percent of monomers providing thermosetting characteristics and consisting essentially of a formaldehyde adduct with an allyl carbamate providing N-methylol functionality, and at least 40 percent of vinyl ester with a saturated aliphatic monocarboxylic acid.

2. An emulsion as recited in claim 1 in which said allyl carbamate has the formula:

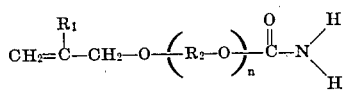

in which $R_1$ is hydrogen or methyl, $R_2$ is an alkylidene group containing from 2–4 carbon atoms, and $n$ is an integer from 0–10.

3. An emulsion as recited in claim 1 in which the N-methylol groups are etherified with a $C_1$–$C_8$ alcohol.

4. An emulsion as recited in claim 1 in which said adduct is mono N-methylol allyl carbamate.

5. An emulsion as recited in claim 1 in which said adduct contains from 1–2 moles of formaldehyde per mole of said carbamate.

6. An emulsion as recited in claim 5 in which said carbamate is allyl carbamate and said vinyl ester is vinyl acetate.

7. An emulsion as recited in claim 1 in which said monomers providing thermosetting characteristics include a minor proportion of monoethylenic unsaturated amide.

8. An emulsion as recited in claim 7 in which said amide is acrylamide or methacrylamide.

9. An emulsion as recited in claim 1 in which at least 55 percent of the copolymer consists of vinyl acetate.

10. An emulsion as recited in claim 1 in which said monomers providing thermosetting characteristics include a minor proportion of monoethylenic alcohol.

11. An emulsion as recited in claim 1 in which said copolymer further includes from 0.5–3 percent of a monoethylenic carboxylic acid.

12. An emulsion as recited in claim 1 in which said monomers providing thermosetting characteristics are present in an amount of from 2–10 percent.

13. An emulsion as recited in claim 1 in which said aqueous medium includes a protective colloid.

14. An aqueous emulsion comprising an aqueous medium having colloidally suspended therein an emulsion copolymer consisting essentially of from 5–40 percent of ethylene, at least 55 percent of vinyl acetate, and monomers providing thermosetting characteristics and containing from 0.5–7 percent of a formaldehyde adduct with an allyl carbamate providing N-methylol functionality, said allyl carbamate having the formula:

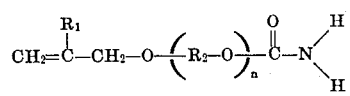

in which $R_1$ is hydrogen or methyl, $R_2$ is an alkylidene group containing from 2–4 carbon atoms, and $n$ is an integer from 0–10.

* * * * *